US011206219B2

(12) United States Patent
Debenedetti et al.

(10) Patent No.: US 11,206,219 B2
(45) Date of Patent: Dec. 21, 2021

(54) METHOD AND APPARATUS FOR MANAGING TRANSPORT OF DELAY-SENSITIVE PACKETS

(71) Applicant: Telefonaktiebolaget LM Ericsson (publ), Stockholm (SE)

(72) Inventors: Paolo Debenedetti, Genoa (IT); Stefano Stracca, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/762,670

(22) PCT Filed: Nov. 13, 2017

(86) PCT No.: PCT/EP2017/079076
§ 371 (c)(1),
(2) Date: May 8, 2020

(87) PCT Pub. No.: WO2019/091587
PCT Pub. Date: May 16, 2019

(65) Prior Publication Data
US 2021/0036962 A1 Feb. 4, 2021

(51) Int. Cl.
*H04L 12/28* (2006.01)
*H04L 12/875* (2013.01)
(Continued)

(52) U.S. Cl.
CPC ........ *H04L 47/564* (2013.01); *H04L 12/5601* (2013.01); *H04L 47/283* (2013.01); *H04L 47/32* (2013.01); *H04L 2012/5652* (2013.01)

(58) Field of Classification Search
CPC . H04L 47/564; H04L 12/5601; H04L 47/283; H04L 47/32
See application file for complete search history.

(56) References Cited

U.S. PATENT DOCUMENTS

| 2004/0151115 A1* | 8/2004 | Poppe | H04L 47/10 370/230.1 |
| 2013/0145041 A1* | 6/2013 | Ruffini | H04J 3/0673 709/238 |

(Continued)

FOREIGN PATENT DOCUMENTS

| WO | 2015113643 A1 | 8/2015 |
| WO | 2016138950 A1 | 9/2016 |

(Continued)

*Primary Examiner* — Abdelnabi O Musa
(74) *Attorney, Agent, or Firm* — Murphy, Bilak & Homiller, PLLC

(57) ABSTRACT

A method of managing transport of packets transmitted over a time division multiplexed, TDM, link in a network. The method performed at a second network node comprises: receiving (102) blocks of data from a first network node. Data from one packet is received in a plurality of blocks and a first block from a packet has a time-stamp indicating arrival time of the packet at the first network node. The blocks are multiplexed for transmission over the TDM link. The method also comprises: queuing (106) the received blocks and if a block from the top of the queue (108, 110) has a time-stamp (110—yes) and a maximum allowed latency has been exceeded (112) the method discards (116) blocks containing data from the same packet as the block with said time-stamp if there is at least one block containing data from another packet in the queue (114—yes). An apparatus is also disclosed.

20 Claims, 5 Drawing Sheets

(51) Int. Cl.
    *H04L 12/54*     (2013.01)
    *H04L 12/841*     (2013.01)
    *H04L 12/823*     (2013.01)
    *H04L 12/70*     (2013.01)

(56) References Cited

U.S. PATENT DOCUMENTS

| | | | |
|---|---|---|---|
| 2018/0070373 A1* | 3/2018 | Muench | H04L 47/14 |
| 2018/0248797 A1* | 8/2018 | Kim | H04L 12/42 |
| 2019/0140963 A1* | 5/2019 | Sasak | H04L 47/283 |

FOREIGN PATENT DOCUMENTS

| | | | |
|---|---|---|---|
| WO | 2017012635 A1 | 1/2017 |
| WO | 2018104175 A1 | 6/2018 |

* cited by examiner

METHOD AND APPARATUS FOR MANAGING TRANSPORT OF DELAY-SENSITIVE PACKETS

TECHNICAL FIELD

The present invention relates to communications networks, in general, and in particular to a method and an apparatus for managing transport of packets in applications having strong requirements on latency.

BACKGROUND

Elements of the $5^{th}$ generation (5G) Radio Access Network (RAN) based on C-RAN (Cloud RAN) have strong requirements on latency and jitter for their interconnection. At current state of the art, C-RAN uses CPRI (Common Public Radio Interface) that is a TDM-like signal (TDM=Time Division Multiplexing) that can be carried over optical wavelength-division multiplexing (WDM) network with or without prior TDM aggregation. CPRI, however, is not efficient from a bandwidth perspective and a TDM circuit switching does not allow for fractional throughput (e.g. 5 Gb/s bandwidth if a flow is not sending packets over 25 Gb/s rate) and/or statistical multiplexing. To meet the needs for 5G, the new industry standard for 5G fronthaul, eCPRI, is being developed and it will improve bandwidth efficiency, increase capacity and lower latency. eCPRI is an Ethernet packet-based technology.

eCPRI specified in version 1.0 has the same stringent requirements on latency as the earlier CPRI technology, which means it requires switches capable of ensuring latency reduction. Designing networks with low latency and minimal jitter is very complex, it may require expensive components and eventually it is dimensioned for a worst-case scenario.

SUMMARY

It is the object of the present invention to obviate at least some of the above disadvantages and provide an improved method and apparatus for managing transport of packets in applications having strong requirements on latency.

Accordingly, the invention seeks to preferably mitigate, alleviate or eliminate one or more of the disadvantages mentioned above singly or in any combination.

According to a first aspect of the present invention there is provided a method of managing transport of packets transmitted over a time division multiplexed, TDM, link in a network. The method performed at a second network node comprises receiving blocks of data from a first network node, wherein data from one packet is received in a plurality of blocks and a first block from a packet has a time-stamp indicating arrival time of the packet at the first network node. The blocks are multiplexed for transmission over the TDM link. The method also comprises queuing the received blocks in a queue and checking a block from top of the queue. If the block has a time-stamp the method comprises determining if a maximum allowed latency has been exceeded using the time-stamp. The method comprises discarding blocks containing data from the same packet as the block with said time-stamp if the maximum allowed latency has been exceeded and there is at least one block containing data from another packet in the queue.

According to a second aspect of the present invention there is provided a second network node for managing transport of packets transmitted over a time division multiplexed, TDM, link in a network. The second network node comprises a processor and a memory. The memory contains instructions executable by the processor such that the second network node is operative to receive blocks of data from a first network node, wherein data from one packet is received in a plurality of blocks. A first block from a packet has a time-stamp indicating arrival time of the packet at the first network node. The blocks are multiplexed for transmission over the TDM link. The second network node is also operative to queue the received blocks and to check a block from top of the queue. If the block has a time-stamp the second network node is operative to determine, using the time-stamp, if a maximum allowed latency has been exceeded. If the maximum allowed latency has been exceeded and there is at least one block containing data from another packet in the queue the second network node is operative to discard blocks containing data from the same packet as the block with said time-stamp.

According to a third aspect of the present invention there is provided a second network node for managing transport of packets transmitted over a time division multiplexed, TDM, link in a network. The second network node comprises an interface for receiving blocks of data from a first network node, wherein data from one packet is received in a plurality of blocks. A first block from a packet has a time-stamp indicating arrival time of the packet at the first network node. The blocks are multiplexed for transmission over the TDM link. The second network node also comprises a plurality of queues connected to the interface for queuing the received blocks routed to said queues by said interface, a plurality of output packet assemblers and a plurality of egress ports. A first queue, a first output packet assembler and a first egress port are arranged in series and the first output packet assembler is configured to check a block from top of the first queue. If the block has a time-stamp the first output packet assembler is configured to determine if a maximum allowed latency has been exceeded using the time-stamp. The first output packet assembler is further configured to discard blocks containing data from the same packet as the block with said time-stamp if the maximum allowed latency has been exceeded and there is at least one block containing data from another packet in the first queue.

According to a fourth aspect of the present invention there is provided a second network node for managing transport of packets transmitted over a time division multiplexed, TDM, link in a network. The second network node is adapted to receive blocks of data from a first network node, wherein data from one packet is received in a plurality of blocks. A first block from a packet has a time-stamp indicating arrival time of the packet at the first network node. The blocks are multiplexed for transmission over the TDM link. The second network node is adapted to queue the received blocks and check a block from top of the queue. If the block has a time-stamp, the second network node is adapted to determine, using the time-stamp, if a maximum allowed latency has been exceeded. If the maximum allowed latency has been exceeded and there is at least one block containing data from another packet in the queue the second network node is adapted to discard blocks containing data from the same packet as the block with said time-stamp.

According to a fifth aspect of the present invention there is provided a network comprising at least a first network node and a second network node. The first and the second network nodes being connected by at least one time division multiplexed, TDM, link. The first network node is adapted to send packets to the second network node, wherein data from one packet is sent in a plurality of blocks. A first block from a packet has a time-stamp indicating arrival time of the packet at the first network node. The blocks are multiplexed for transmission over the TDM link. The second network node is adapted to receive the blocks of data from the first network node and to queue the received blocks. The second network node is also adapted to check a block from top of the queue and if the block has a time-stamp the second network node is adapted to determine, using the time-stamp, if a maximum allowed latency has been exceeded. If the maximum allowed latency has been exceeded and there is at least one block containing data from another packet in the queue the second network node is adapted to discard blocks containing data from the same packet as the block with said time-stamp.

According to a sixth aspect of the present invention there is provided a computer program, comprising instructions which, when executed on at least one processor, cause the at least one processor to carry out the method disclosed above.

According to a seventh aspect of the present invention there is provided a carrier containing the computer program disclosed above, wherein the carrier is one of an electronic signal, optical signal, radio signal, or computer readable storage medium.

Further features of the present invention are as claimed in the dependent claims.

The present invention in its various embodiments disclosed below provides the benefit of eliminating from the traffic delay-sensitive data that, which is delayed more than maximum allowed latency. By early eliminating such delayed data we prevent it from contributing to congestion in the network.

BRIEF DESCRIPTION OF THE DRAWINGS

The present invention will be understood and appreciated more fully from the following detailed description taken in conjunction with the drawings in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

The solution in its various embodiments to be disclosed improves latency of data transmitted across a network by eliminating from the traffic data that is already delayed too much to be useful. This way the delayed data does not add to the traffic upstream from the network node which eliminated it and in this way congestion is avoided and latency does not increase as it would with all the traffic continuing towards respective destinations.

Figure 4:
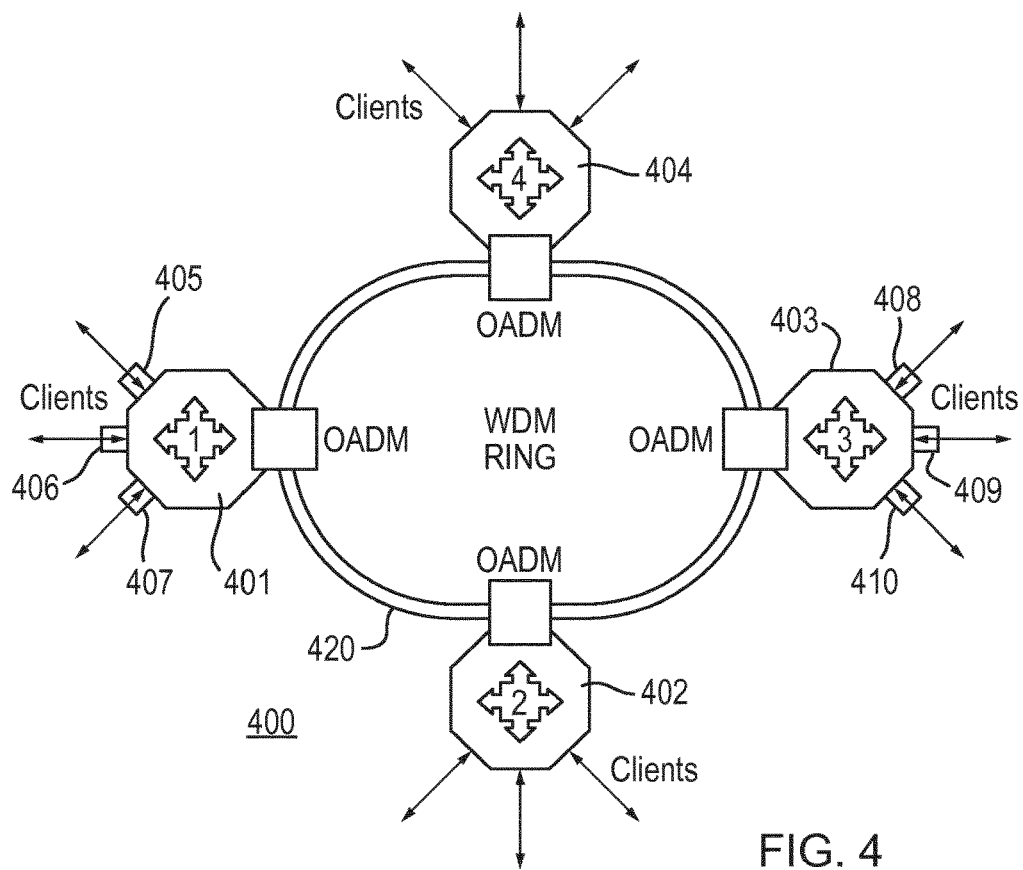
FIG. 4 is a diagram illustrating a communications network operating in one embodiment of the present invention.

FIG. 4 illustrates one possible embodiment of physical network connections, which is a WDM based ring where the line connections between the nodes are realized with individual WDM links added and/or dropped with fixed or reconfigurable Optical Add and Drop Multiplexers (OADM or ROADM, R=reconfigurable). Each network node has a set of client ports and a set of line ports. Clients may be either TDM based interfaces (e.g. CPRI, OBSAI) or packet based interfaces (e.g. Ethernet, eCPRI). Line interface are synchronous TDM links where framing structure is designed to guarantee low latency and to carry synchronization and timing information as is known in the art.

Figure 1:
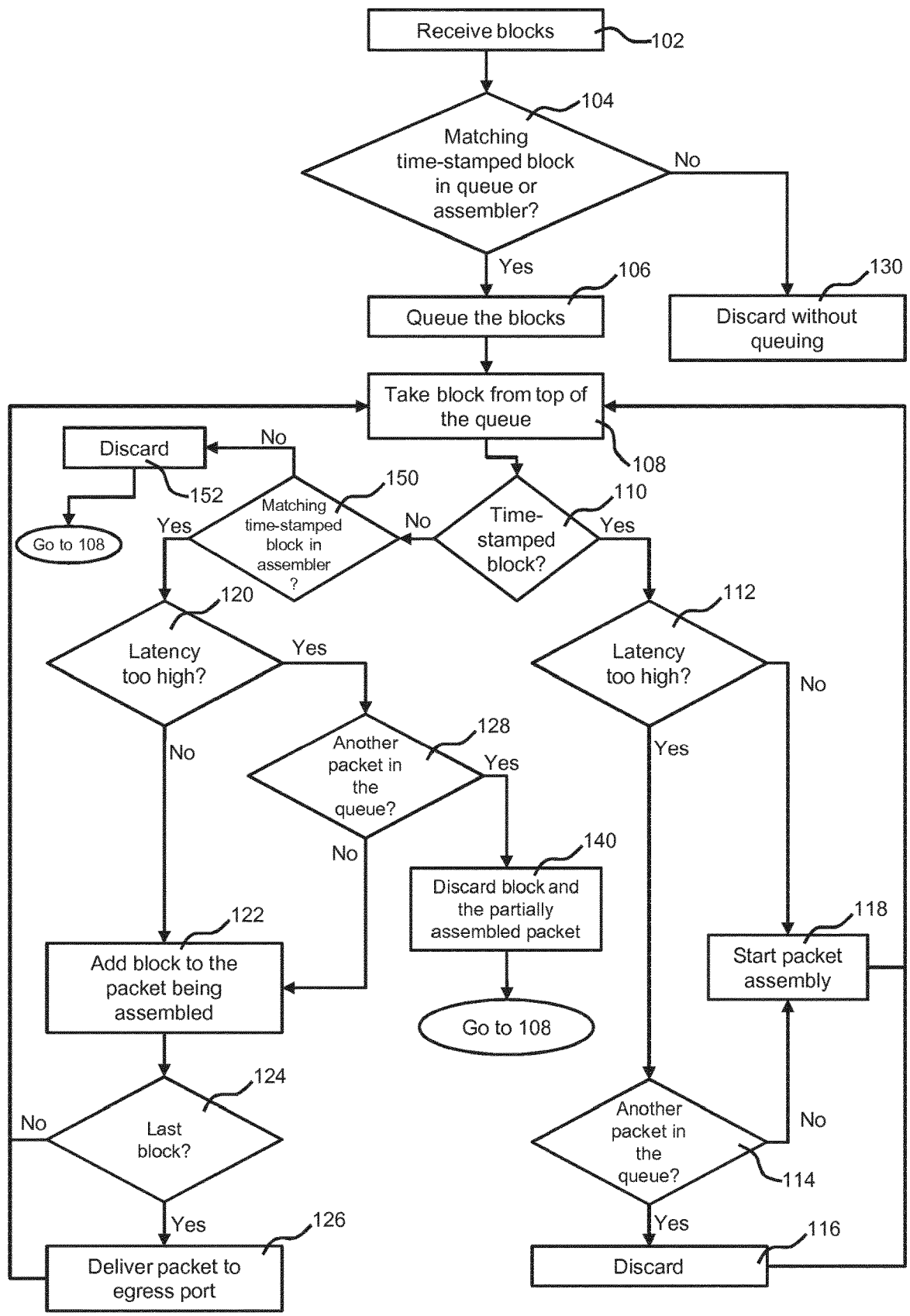
FIG. 1 is a flow chart illustrating a method of managing transport of packets in a network in one embodiment of the present invention.

FIG. 1 illustrates an embodiment of a method for managing transport of packets transmitted over a time division multiplexed (TDM) link in a network. The method is performed at a second network node receiving, 102, blocks of data from a first network node. As illustrated in the example in FIG. 4, the first network node may be the node 401 and the second network node may be the node 403. In this embodiment data from a packet is received at the second network node, 403, in a plurality of blocks, wherein a first block from the packet has a time-stamp indicating arrival time of the packet at the first network node, 401. The blocks being multiplexed for transmission over the TDM link. In a preferred embodiment the time-stamp is carried in the first block of the block (i.e. in the payload portion of the block). Depending on the length (size) of the block there may be no room for other data in the payload portion due to the size of a timestamp.

The multiplexed traffic, depending on embodiment in which this solution operates, may be multiplexed using any kind of multiplexing mechanism including: priority based, round-roubin, statistical, SDN controlled, random, etc.

Figure 6:
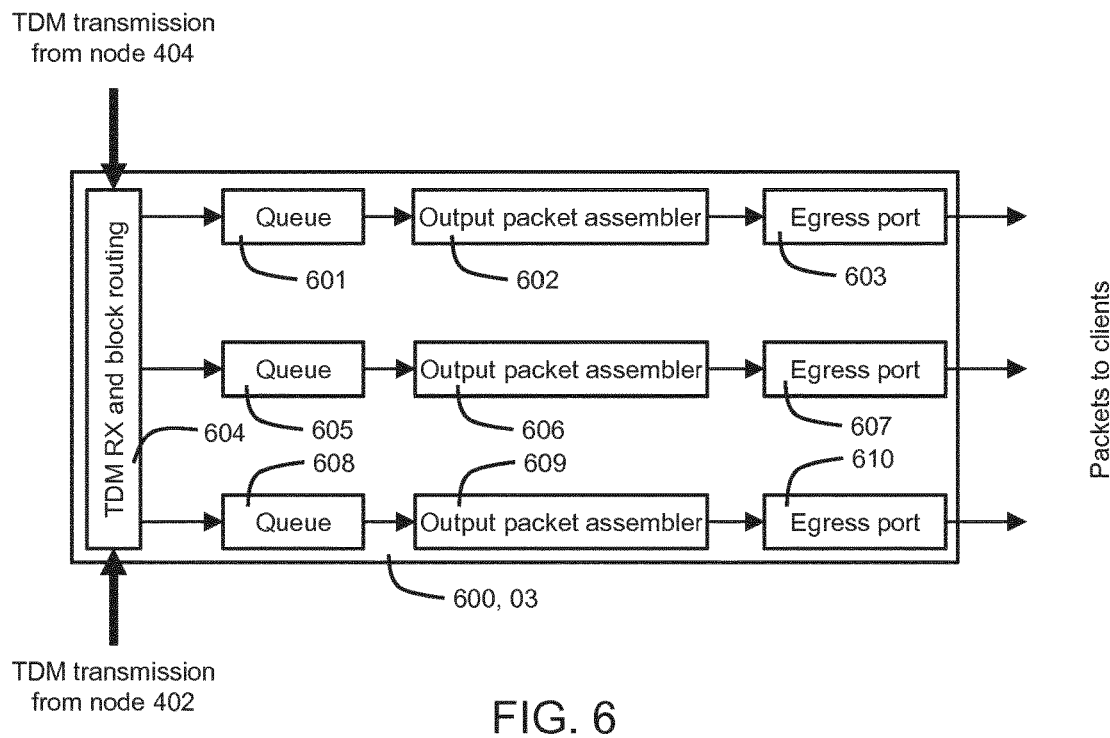
FIGS. 6-8 are diagrams illustrating a second network node in embodiments of the present invention.

When the blocks are received by the second network node, 403, they are queued, 106. In a preferred embodiment, as shown in FIG. 6, each egress port of the second network node, 403, has a queue, 601. In the following operation the method comprises checking a block from top of the queue, 108, 110, and if the block has a time-stamp, 110—yes, it indicates it is a first block of a packet. In this situation the method comprises determining if a maximum allowed latency has been exceeded, 112, using the time-stamp. If the maximum allowed latency has been exceeded, 112—yes, and there is at least one block containing data from another packet in the queue, 114—yes, the method comprises discarding, 116, blocks containing data from the same packet as the block with said time-stamp.

Figure 2:
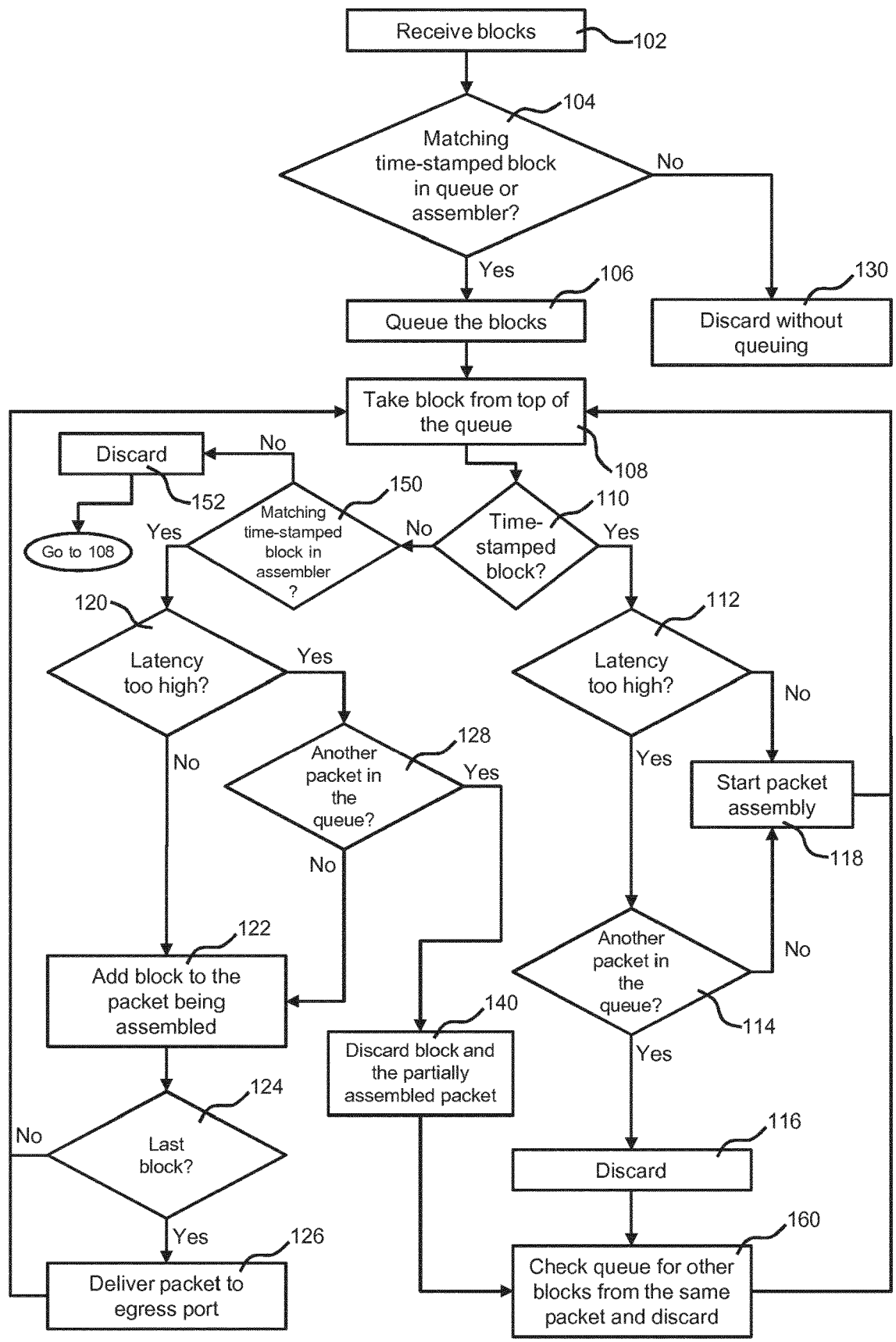
FIG. 2 is a flow chart illustrating a method of managing transport of packets in a network in alternative embodiment of the present invention.

The operation of discarding can be implemented in at least two different ways. In one embodiment the time-stamped block with exceeded maximum allowed latency is discarded, 116, and then each time another block from the same packet is taken from the top of the queue the block is discarded too. This is illustrated in FIG. 1: the method loops back from step 116 to 108 and because the first block of the packet has been discarded there will be no matching time-stamped block in the assembler for any block taken from the top of the queue: steps 110—no, 150—no, 152. This is repeated and all blocks from said packet will be discarded. Alternatively, in order to optimize queue length and secure faster block selection, an optional process to purge blocks belonging to the discarded packet is envisaged. This alternative embodiment is optional and may run in parallel with the block selection process. As illustrated in FIG. 2, after detection of a time-stamped block with exceeded maximum allowed latency, steps 112—yes and 114—yes, the time-stamped block is discarded, 116, and the method checks the content of the queue, and discards from the queue all blocks containing data from the same packet as said discarded first block, step 160. Only after the queue is purged in this way another block from the top of the queue is taken for processing.

This method is particularly beneficial for solutions in which packets which are delayed more than a defined threshold (i.e. too high latency) are no longer needed. By identifying them early and eliminating them from the traffic they will not compete for resources with other packets which are not delayed and can still be delivered in time to their intended destinations.

The above described mechanism requires that the node performing the packet assembly function can calculate the latency. For that purpose, one of the known in the art time information distribution mechanisms is implemented in the network, for example the one disclosed in WO2017/012635.

In operation of a network employing the solution as described above with reference to FIG. 1 at the first network node, 401, incoming packets are disassembled and data from the incoming packets is segmented into fixed-length blocks. In this way a single packet received at one of the ingress ports, 405, 406 or 407, of the first network node, 401, is transported through the network in a plurality of blocks. In one embodiment each of these blocks may be 20 bytes long. In alternative embodiments different length (size) of the block may be used. Each block carries information identifying the destination egress port in an overhead portion of the block. In a preferred embodiment the information identifying the destination egress port is carried in a first label (e.g. 8 bit long, but other lengths are also possible). The information identifying the destination egress port is used for routing the blocks to their respective destination egress ports, for example egress ports 408, 409 or 410 at the second network node 403. The length of 20 bytes is the minimal length to detect the MAC address of the packet and take decision on the labelling of its blocks. The longer the block, the higher is the latency introduced on a trunk interface, so keeping the blocks short will allow for their faster processing. However, as mentioned earlier longer blocks are also possible. As mentioned earlier, the first block of a packet includes a time-stamp indicating the arrival time of the packet at the first network node, 401. This information is later used at the second node, 403, to evaluate the end-to-end latency.

Figure 5:
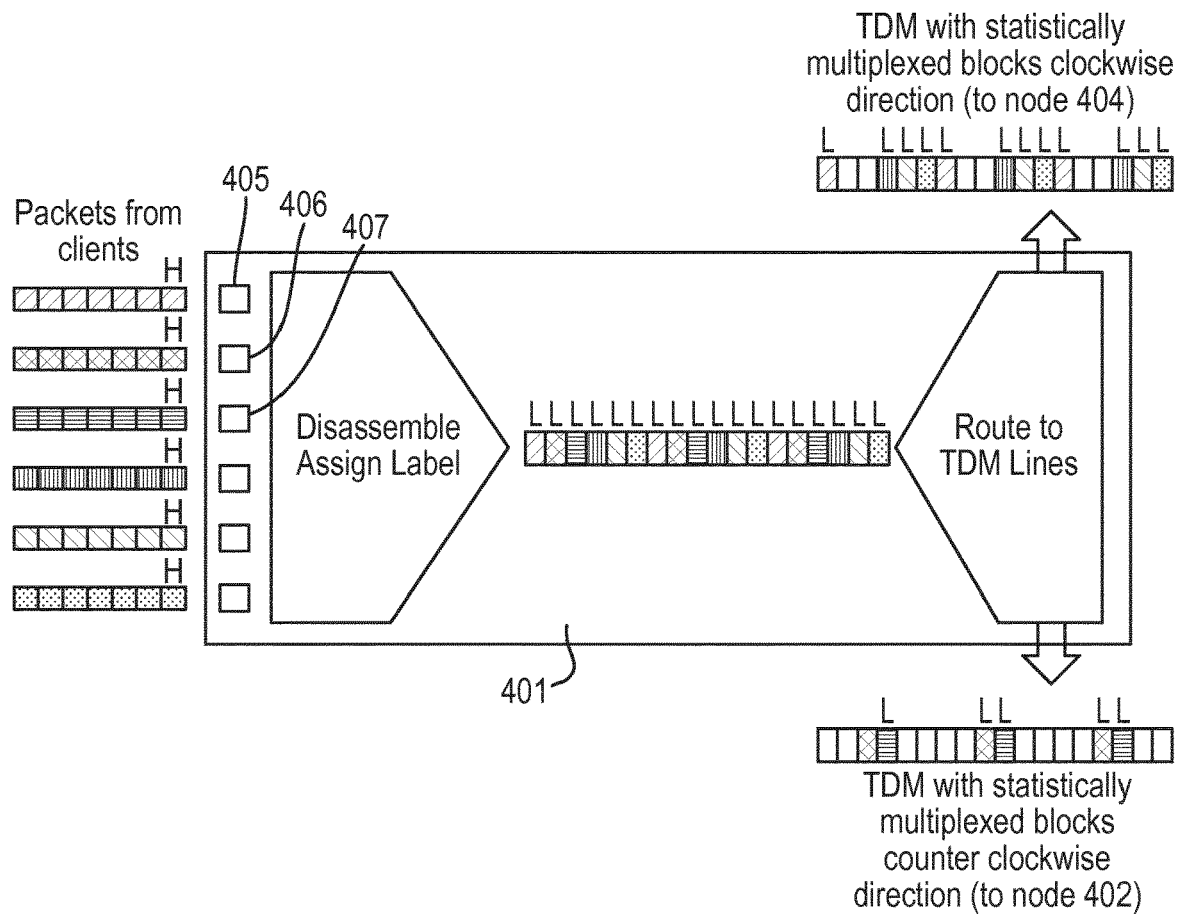
FIG. 5 is a diagram illustrating a first network node as used in one embodiment of the present invention.

Blocks from different ingress ports in the first network node are routed to the proper TDM link port based on pre-configured rules, base e.g. on destination MAC address, VPN label, etc. In one embodiment the blocks are multiplexed and transmitted over a TDM link to a second network node. FIG. 5 illustrates one embodiment of a multiplexing performed at, for example, the first network node 401 shown in FIG. 4. In FIG. 5 ingress ports shown on the left-hand side receive data in packets from clients. These packets are disassembled in the first network node 401 and segmented into fixed-length blocks which are transmitted to their target TDM link to ports in clockwise and counter-clockwise directions in the ring network towards their egress nodes. In a preferred embodiment, if the packet is an Ethernet packet, in the operation of disassembling the pre-amble is discarded at ingress and rebuilt at egress (there is no need to transmit it) and the ingress node searches for a DMAC address and then proceeds for the next bytes (bitstream mapping) in order to put them into the fixed-length blocks.

For part of the traffic the second network node (destination) may be nodes 402 or 404, but part may go to node 403 and then to their clients. A big advantage of this solution is that it is applicable also to intermediate network nodes. This means that in the situation illustrated in FIG. 4, when traffic goes from the first network node, 401 to the second network node 403 the operation of discarding packets with latency exceeding the maximum allowed latency may be performed not only at the second network node 403 but also at the intermediate node 402 for counter-clockwise traffic direction and at the intermediate node 404 for clockwise traffic direction. In these embodiments the intermediate nodes 402 and 404 operate as a second node described in the embodiment above with node 403 being their client. If a packet is not delayed the blocks of this packet are forwarded towards their destination node.

The advantage of this embodiment is that as soon as it is detected that a packet exceeded its maximum allowed latency the blocks carrying data from this heavily delayed packet are discarded and do not negatively affect latency of the remaining packets (blocks) transmitted in the network. Heavily delayed in this document means that the maximum allowed latency has been exceeded. Yet another advantage of this solution is that the discarding of the delayed packets is performed at Layer 1 (physical layer) by operating on the frames of the TDM transmission (the blocks that carry the data from the packet) without the need for operation on higher layers. This approach optimises processing as there is no need to process the packets (i.e. no need to reassemble the packet)—all information that is necessary to decide on discarding is readily available with the first block of the packet. Assembling only to discard would be wasting computation resources.

In an alternative embodiment, for packets which are to be delivered to egress ports of the second node, 403, and for onward transmission to their respective packet clients, if it is determined that the maximum allowed latency has not been exceeded, 112—no, the method comprises assembling the packet using the first, 118, and remaining blocks, 122, containing data from the packet. As shown in the embodiment illustrated in FIG. 1, once the packet assembly starts, 118, the method preferably loops back and takes a block from the top of the queue, 108. If the block is not time-stamped, 110—no, and carries data from the same packet as the packet being assembled then the process responsible for the packet assembly knows that its latency is not too high, step 120—no, and adds this block the packet being assembled, 122. This loop is repeated, 124—no, until the last block containing data from the packet being assembled is detected, 124—yes. Once the assembly is completed the method comprises delivering said packet to a destination egress port, 126, of the second network node.

It may happen that after assembling of a packet has started in step 118, or before assembling of a packet has completed in steps 124—yes and 126, a block is taken from the top of the queue and, 108, and it comprises a time-stamp indicating it is a first block of another packet. This situation may occur because blocks belonging to several packets can be present in the queue, 601, at the same time—this may occur when an egress port receives packets from different ingress ports. In this situation the following time-stamped block will be treated the same way as the first one—discarded if the latency is too high and another packet waits in the queue or assembled for onward transmission to its packet client via a destination egress port.

In processing of blocks taken from the queue, 601, blocks containing data from different packets are distinguished based on information carried in the overhead portion of the block. In a preferred embodiment this overhead portion may be realised as a label (or labels) appended to each of the blocks. The overhead portion of a block may carry information elements containing information described in this document as carried in a label or in a plurality of labels.

In one embodiment the label (third label) explicitly identifies the packet the block belongs to. Alternatively, the blocks containing data from different packets may be distinguished based on a label (second label) containing identification of the ingress port at the first node. Because the method operates on blocks transmitted in a TDM network it means the blocks arrive in the same order as they were sent. This means a time-stamped block 0 will be followed by n blocks without a time-stamp—this is how the blocks leave the first node, 401. At the second node, 403, there will be more than one stream of blocks mixed and queuing for the same egress port. However, it is enough to know the address of the ingress port at the first node because blocks from this port would be in the same order in the queue at the destination end even if they are separated from each other by blocks from other packets.

As explained earlier, the loop in which a packet is assembled, steps 118 and 122, is repeated, 124—no, until the last block containing data from the packet being assembled is detected, 124—yes. Detection of the last block may be carried out according to at least two embodiments. As discussed in the previous paragraph in TDM system the blocks arrive in the same order as they were sent, so we would know that in a string of blocks from the same ingress port blocks that follow a block with a time-stamp until a next block with a time stamp is detected belong to the same packet. This means that detection of another time-stamped block from the same ingress port as the packet being assembled indicates an end of the packet being assembled. The check in step 124 returns "yes" and the packet is delivered to the egress port. This solves the problem of identifying the last block of a packet, but it also means that the packet being assembled must wait at least one extra cycle until the next one with a time-stamp is found to conclude that there are no more blocks for this packet. Therefore, in an alternative embodiment the last block of a packet comprises a fourth label explicitly indicating the end of the packet. This embodiment has the advantage that there is no need to wait for detection of the next block with a time-stamp from the same ingress port, the packet may be assembled and sent immediately after the last block is detected using the fourth label explicitly indicating the last block.

In another alternative embodiment, for a packet which is to be delivered to an egress port of the second node, 403, and for onward transmission to its respective packet client, if it is determined that the maximum allowed latency has been exceeded, 112—yes, and there is no block containing data from another packet in the queue, 114—no, the method comprises assembling the packet using the first, 118, and remaining blocks, 122, containing data from the packet. Once assembled said packet is delivered to a destination egress port, 126, of the second network node. This embodiment allows for processing blocks comprising data from a packet with latency above the maximum allowed latency in situations when such processing has no negative effect on other packets, i.e. when no other packet is waiting in the queue, 601. When there is no other packet in the queue, step 114—no, even though the latency is too high, step 112—yes, the method allows for starting assembly of the packet, step 118. The method then loops back to step 108, when a block is taken from the top of the queue. The method follows steps similar to the earlier described embodiment, but with the affirmative answer to question in step 120 the method follows to step 128. Assembling of the packet continues as long as there is no other packet in the queue, step 128—no. Steps 122, 124 and 126 are performed in the same way as discussed earlier.

In a preferred embodiment assembling of the packet is stopped and the blocks from the packet are discarded, 140, if after the operation of assembling the packet started, 118, a new block with a time-stamp is found in the queue, 120—yes and 128—yes. Affirmative answer to the question in step 128 results in discarding the currently examined block and the partially assembled packet from the output packet assembler, 140, as well as discarding blocks from this packet still waiting in the queue. Discarding the blocks still waiting in the queue may be realised either by taking one block in a cycle (loop 140-108-110—no-150—no-152 in FIG. 1) or by checking the queue for other blocks from this packet and discarding them (steps 140-160 in FIG. 2).

The above embodiment may be described as "best effort", if it is possible to process blocks of a packet delayed more than the maximum allowed latency without negative effect on another packet the blocks will be processed and the packet will be assembled and delivered, but the processing and assembling may be stopped at any time if another packet waiting in the queue is detected. Preferably, checking if there is at least one block containing data from another packet in the queue, 114, 128, comprises checking if there is a time-stamped block in said queue.

A fault or an error in operation of a network element may result in a block being lost before it reaches its intended destination. This may also happen to a first block of a packet (the time-stamped one). This means that when subsequent blocks from the same packet arrive at the second network node, 403, there will be no time-stamped block from their packet in the queue or in the output packet assembler, 602. To handle this situation, in one embodiment the method comprises discarding without queuing, 130, incoming blocks which do not have a matching time-stamped block in the queue or in an output packet assembler, 104—no.

The method in its various embodiments is particularly applicable to timely delivery of eCPRI, messages in fronthaul solutions, particularly in 5G RAN. In these embodiments a packet comprises an eCPRI message or a plurality of concatenated eCPRI messages. Although eCPRI is used in fronthaul solution only, the solution as described in the various embodiments here, is also applicable to other fronthaul and backhaul interfaces (e.g. S1, X2, F1) and not having so stringent latency requirements.

Figure 3:
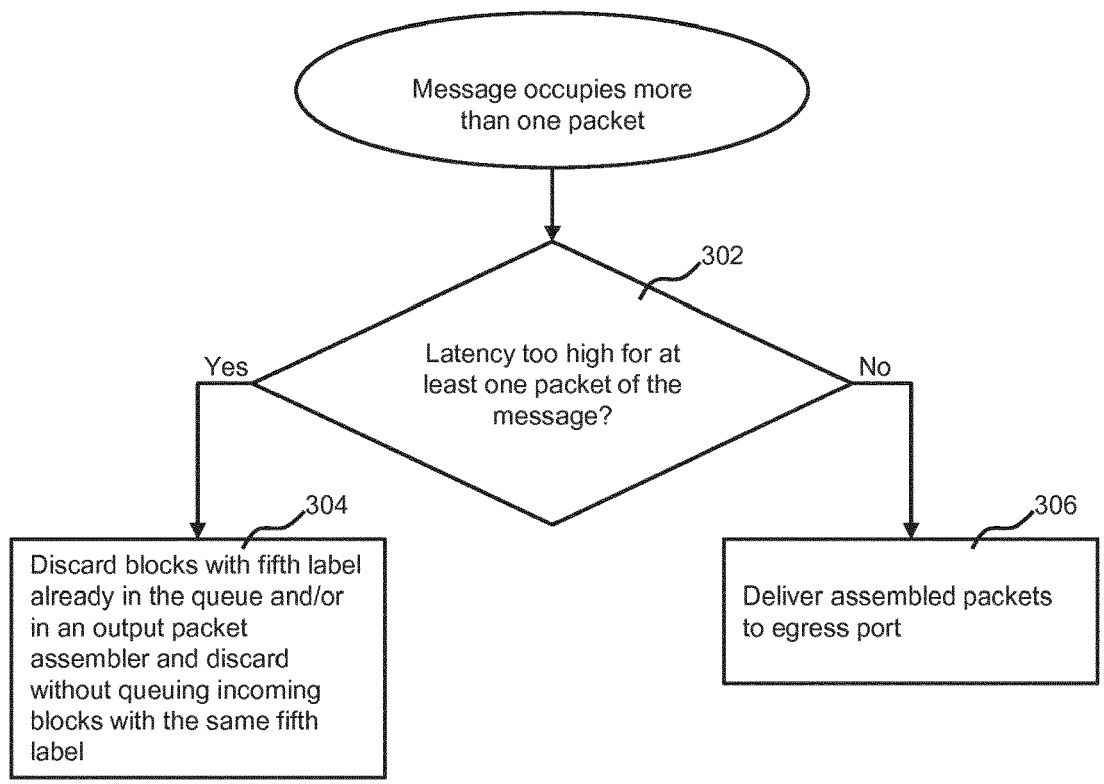
FIG. 3 is a flow chart illustrating a method of managing transport of packets in a network in another alternative embodiment of the present invention.

However, in alternative embodiments a message transmitted from the first network node, 401, to the second network node, 403, may occupy more than one packet. In order to effectively manage transport of these packets if latency of one of them exceeded the maximum allowed latency and the blocks carrying data from this packet need to be discarded also the remaining packets carrying this massage will be discarded. This way they will not contribute to the traffic (congestion). Therefore, in one embodiment, illustrated in FIG. 3, in order to address the problem of a message occupying more than one packet the blocks containing data from the packets of said message comprise a fifth label identifying said message and the method comprises discarding blocks, 304, with the same fifth label if it has been determined for at least one of the packets of said message that the maximum allowed latency has been exceeded, 302—yes. Discarding packets of a message in this embodiment comprises discarding blocks with said fifth label already in the queue, 601, and/or in an output packet assembler, 602, as well as discarding without queuing incoming blocks with the same fifth label. If the maximum allowed latency has been exceeded not for the first packet of the message, but for one of the subsequent packets then the first and other packets with latency below the threshold will be sent towards their destination packet client, but by eliminating the remaining packets of the message the likelihood of causing congestion will be reduced. Alternatively, if it has been determined that none of the packets of said message had the maximum allowed latency exceeded, 302—no, then the assembled packets are delivered, 306, to the egress port.

The above description discloses embodiments in which blocks have labels that help with handling these blocks as they travel through the network. Information carried in these labels include:
   first label: identification of a destination egress port at the second network node;
   second label: identification of an ingress port at the first network node;
   third label: identification of the packet from which data is carried in the block;
   fourth label: identification of the last block of a packet;
   fifth label: identification of a message transmitted from the first network node to the second network node occupying more than one packet.

Although these labels are listed above as separate labels they may be combined so that one label carries more than one identification element, e.g. a label carrying identification of a destination egress port at the second network node and identification of an ingress port at the first network node. Depending on embodiment some of the information fields in the label would be optional depending on how certain functions/operations are realised in practice. For example, as explained earlier the last block of a packet may be identified using explicit label or by waiting for a next time-stamped block from the same ingress port, so the fourth label is not essential, so the information field identifying the last block (or a separate label identifying the last block) is optional. Similarly, blocks may be identified as carrying data from the same packet by using explicit identification of a packet in the label or implicitly by identification of the ingress port at the first network node. In yet another embodiment other mechanisms for carrying address information and other identification data may be used instead of labels.

Figure 8:
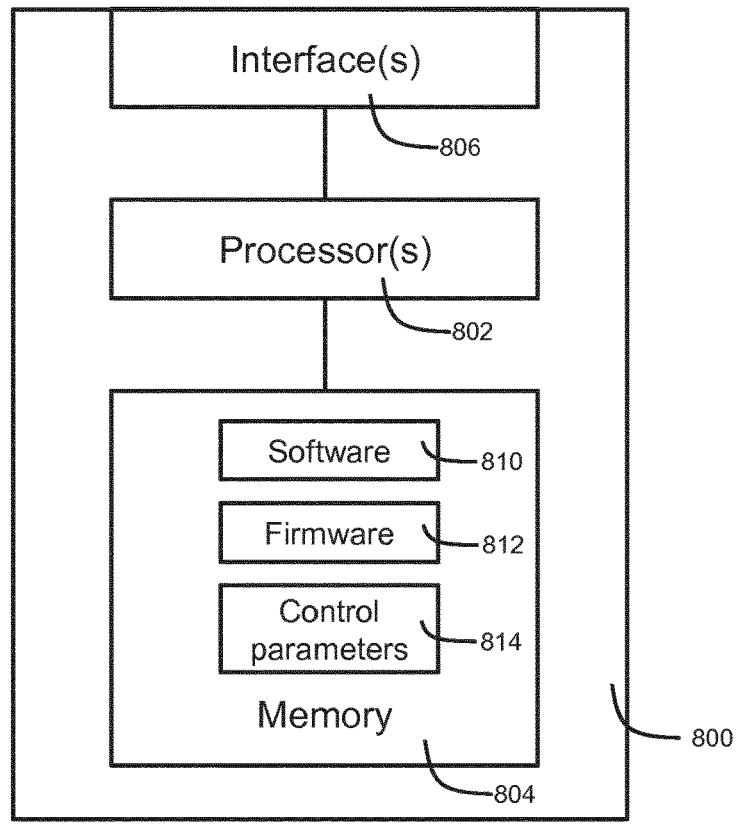

FIG. 8 illustrates an embodiment of a second network node, 800, operative to manage transport of packets transmitted over a time division multiplexed, TDM, link in a network in accordance with embodiments of the method described above.

The second network node, 800, comprises a processor, 802, and a memory, 804. The memory, 804, contains instructions executable by the processor, 802. When the processor executes the instructions, 802, the second network node, 800, is operative to receive blocks of data from a first network node. The blocks of data are received via one of the interfaces 806 for communicating with the TDM network. FIG. 8, for simplicity, illustrates collectively the interfaces used by the second network node, 800. These interfaces, 806, include TDM interface(s) for connection to the fronthaul or backhaul network (or any other type of network where this solution may be applicable), interface(s) for connection to packet clients, interface for connection to a network management system, etc. In operation, data from one packet is received on a TDM link in a plurality of blocks and a first block from a packet has a time-stamp indicating arrival time of the packet at the first network node. The blocks are multiplexed for transmission over the TDM link. When the blocks are received, the second network node, 800, is operative to queue these received blocks. The blocks wait in the queue for their turn of being processed. The second network node, 800, checks a block from top of the queue and if the block has a time-stamp (a time stamp indicated it is a first block from a packet) the second network node, 800, is operative to determine, using the time-stamp, if a maximum allowed latency has been exceeded. If the maximum allowed latency has been exceeded and there is at least one block containing data from another packet in the queue the second network node, 800, discards blocks containing data from the same packet as the block with said time-stamp. As explained earlier, in a preferred embodiment the time-stamp is carried in the first block of the block (i.e. in the payload portion of the block). Depending on the length (size) of the block there may be no room for other data in the payload portion due to the size of a timestamp.

If it is determined that the maximum allowed latency has not been exceeded the second network node, 800, is operative to assemble the packet using the first and remaining blocks containing data from the packet and deliver said packet to a destination egress port of the second network node.

Preferably, if it is determined that the maximum allowed latency has been exceeded and there is no block containing data from another packet in the queue the second network node, 800, is operative to assemble the packet using the first and remaining blocks containing data from the packet and deliver said packet to a destination egress port of the second network node. In this preferred embodiment the second network node, 800, is capable of exploiting an opportunity to deliver a delayed packet when this would not negatively affect other, timely, traffic in the network. Therefore, in yet another preferred embodiment the second network node, 800, is operative to stop the assembling and discard the blocks containing data from the packet if after the operation of assembling the packet started a new block with a time-stamp is found in the queue. This way other packets are given priority over a packet delayed more than the maximum allowed latency.

In a preferred embodiment the second network node, 800, checks if there is at least one block containing data from another packet in the queue by checking if there is at least one time-stamped block in said queue.

In order not to use computing resources on processing blocks that cannot be delivered on time additionally an attempt of delivering them could delay other blocks (packets) the second network node, 800, preferably discards without queuing incoming blocks which do not have a matching time-stamped block in the queue or in an output packet assembler. This may happen when the first block of a packet is lost as a result of an error or fault in the network or because the first block was delayed more that the maximum allowed latency and discarded.

As discussed earlier the method is particularly applicable to delivering eCPRI messages in packets in fronthaul and backhaul networks. In these embodiments a single eCPRI message or a plurality of concatenated eCPRI messages are transmitter in a single packet. It may be, however, in some embodiments that a single message is transmitted in more than one packet. Therefore, in one embodiment, if a message occupies more than one packet then the blocks containing data from the packets of said message comprise a fifth label. The fifth label identifies said message and the second network node, 800, is operative to discard packets with the same fifth label if it has been determined for at least one of the packets of said message that the maximum allowed latency has been exceeded.

Discarding packets of a message in this embodiment comprises the second network node, 800, discarding blocks with said fifth label which are already in the queue and/or in an output packet assembler as well as discarding without queuing incoming blocks with the same fifth label. If the maximum allowed latency has been exceeded not for the first packet of the message, but for one of the subsequent packets then the first and other packets with latency below the threshold will be sent towards their destination packet client, but by eliminating the remaining packets of the message the likelihood of causing congestion will be reduced.

In alternative embodiment, the second network node, 800, may include more than processor 802 coupled to the interface(s) 806, and to the memory 804. By way of example, the interface(s) 806, the processor(s) 802, and the memory 804 could be coupled by one or more internal bus systems of the second network node, 800. In another embodiment, as illustrated in FIG. 8 these components are connected in series. The memory 804 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory 804 may include software 810, firmware 812, and/or control parameters 814. The memory 804 may include suitably configured program code to be executed by the processor(s) 802 so as to implement the above-described functionalities of a second network node, such as explained in connection with FIG. 1A, or 1B, or 2.

It is to be understood that the structures as illustrated in FIG. 8 are merely schematic and that the second network node, 800, may actually include further components which, for the sake of clarity, have not been illustrated, e.g., further interfaces or processors. Also, it is to be understood that the memory, 804, may include further program code for implementing known functionalities of a network node operating in a TDM network. According to some embodiments, also a computer program may be provided for implementing functionalities of the second network node, 800, e.g., in the form of a physical medium storing the program code and/or other data to be stored in the memory 804 or by making the program code available for download or on any other carrier (e.g. an electronic signal, optical signal, radio signal, or any type of computer readable storage medium).

FIG. 6 illustrates another embodiment of a second network node, 600, operative to manage transport of packets transmitted over a time division multiplexed, TDM, link in a network in accordance with embodiments of the method described above.

The second network node, 600, comprises an interface, 604, for receiving blocks of data from a first network node. As explained earlier, data from one packet is received in a plurality of blocks and a first block from a packet has a time-stamp indicating arrival time of the packet at the first network node. The blocks are multiplexed for transmission over the TDM link.

The second network node, 600, further comprises a plurality of queues, 601, 605, 608, connected to the interface, 604, for queuing the received blocks routed to said queues by said interface, a plurality of output packet assemblers, 602, 606, 609, and a plurality of egress ports, 603, 607, 610. As seen in the embodiment illustrated in FIG. 6 a first queue, 601, a first output packet assembler, 602, and a first egress port, 603, are arranged in series. The same configuration is for each of the other egress ports of the second network node, 600. The first output packet assembler, 602, is configured to check a block from top of the first queue, 601, and if the block has a time-stamp the first output packet assembler, 602, determines if a maximum allowed latency has been exceeded using the time-stamp. The first output packet assembler, 602, is further configured to discard blocks containing data from the same packet as the block with said time-stamp if the maximum allowed latency has been exceeded and there is at least one block containing data from another packet in the first queue, 601. The remaining series of queues, output packet assemblers and egress ports operate in the same way on blocks carrying data from packets addressed to the respective egress ports.

In the embodiment illustrated in FIG. 6 the interface, 604, is configured to route the received blocks to their intended queues. The network node, 600, has a plurality of egress ports and in operation in the field client equipment is connected to these egress ports. Therefore, packet transmission directed to a particular client must be delivered to the egress port connecting the client to the network. This, in turn, means that the blocks received by the interface must be routed to the correct queue. The routing may be realised using one of the know methods and may be based on information identifying the destination egress port which is carried by each of the blocks. Preferably, the routing function is integrated in the interface, 604, but in an alternative embodiment, illustrated in FIG. 7, it may be provided by a dedicated element, 702, located between the interface, 704, and the queues, 601, 605 and 608.

Figure 7:
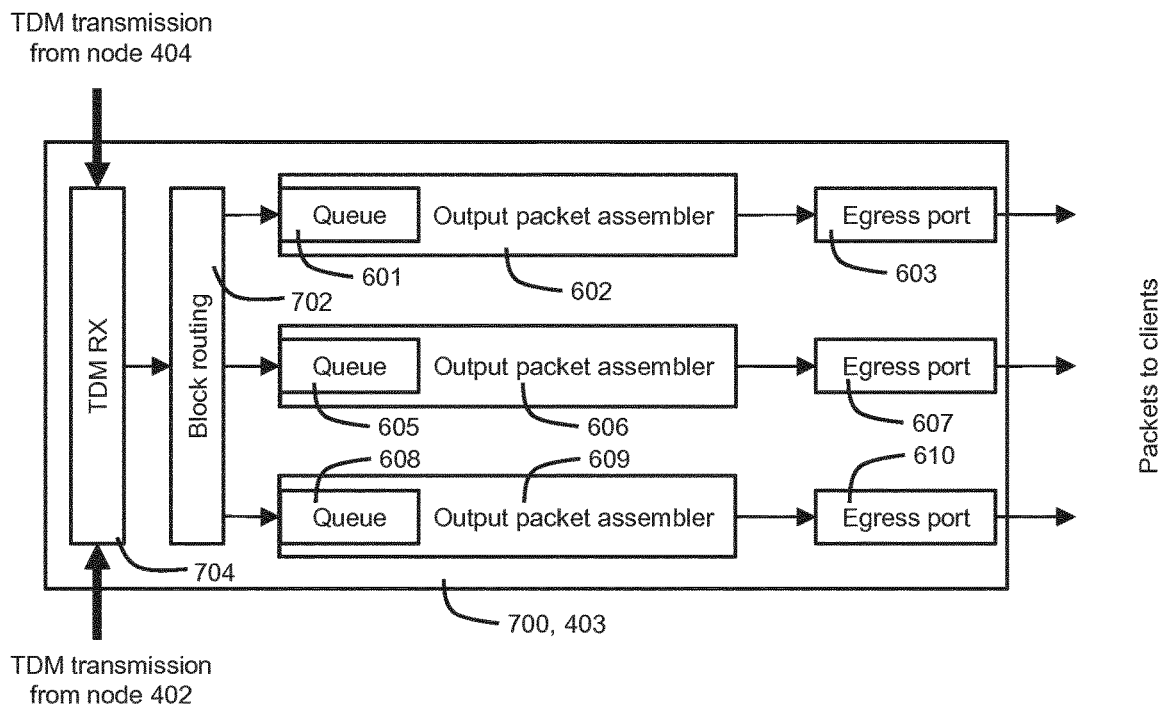

The embodiment illustrated in FIG. 7 illustrates another alternative: the queues, 601, 605 and 608, are integrated into their respective output packet assemblers, 602, 606 and 609.

In a preferred embodiment if it is determined that the maximum allowed latency has not been exceeded, the first output packet assembler, 602, is configured to assemble the packet using the first and remaining blocks containing data from the packet and deliver said packet to the first egress port, 603.

Preferably, if it is determined that the maximum allowed latency has been exceeded and there is no block containing data from another packet in the first queue, the first output packet assembler, 602, is configured to assemble the packet using the first and remaining blocks containing data from the packet and deliver said packet to the first egress port, 603. The first output packet assembler, 602 however is configured to stop assembling the packet and to discard the blocks from the packet if after start of the assembling a new block with a time-stamp is found in the first queue, 601. This embodiment allows for a best effort approach in which the second network node attempts to deliver the packet delayed more than the maximum allowed latency, but abandons the attempt if this would negatively affect another packet waiting in the first queue, 601.

The first output packet assembler, 602, is configured to check if there is at least one block containing data from another packet in the first queue, 601, by checking if there is at least one time-stamped block in said first queue.

To improve efficiency, in a preferred embodiment interface, 604, is configured to discard without queuing incoming blocks which do not have a matching time-stamped block in any of the queues or in an any of the output packet assemblers. A fault or an error in operation of a network element may result in a block being lost before it reaches its intended destination. If this happens to a first block of a packet then subsequent blocks from the same packet after arrival at the second network node will not have a matching time-stamped block (i.e. first block from their packet) in the first queue, 601, or in the first output packet assembler. Any attempt to process such blocks would result in wasting processing resources and therefore it is better to discard these blocks as soon as possible, i.e. discard without queuing incoming blocks which do not have a matching time-stamped block in any of the queues or in an any of the output packet assemblers.

Preferably, in order to handle long messages, if a message transmitted from the first network node to the second network node occupies more than one packet then the blocks containing data from the packets of said message comprise a fifth label identifying said message. To keep high efficiency of processing blocks/packets the first output packet assembler, 602, is configured to discard blocks with the same fifth label if it has been determined, for at least one of the packets of said message, that the maximum allowed latency has been exceeded. Preferably, the first output packet assembler, 602, is configured to discard blocks with said fifth label already in the first queue, 601, and/or in said first output packet assembler, 602, and the interface, 604, is configured to discard without queuing incoming blocks with the same fifth label.

Although the description above was focused on the series of the first queue, 601, the first output packet assembler, 602, and the first egress port, 603, the same is applicable for the remaining serial arrangements of queues, output packet assemblers and egress ports of the second network node, 600, 700.

In practical implementation in an operating network the second network node is also configured to operate as the node performing disassembling of incoming packets, segmenting them into fixed-length blocks and sending them to other nodes over multiplexed TDM link. Conversely, the first network node is configured to operated according to the embodiments of the method described above. As can be seen in FIG. 4 the network, 400, comprises at least a first network node, 401, and a second network node, 403. In the embodiment illustrated in FIG. 4 we also have two additional nodes, 402 and 404, but it would be clear to a person skilled in the art that the network 400 may have fewer or more nodes compared to what is illustrated. The number of nodes, however, does not affect the operation of the network in accordance with embodiments on this invention. The first and the second network nodes being connected by at least one time division multiplexed, TDM, link, 420, wherein the first network node, 401, is adapted to send packets to the second network node, wherein data from one packet is sent in a plurality of blocks. A first block from a packet has a time-stamp indicating arrival time of the packet at the first network node, 401. The blocks are multiplexed for transmission over the TDM link, 420. The second network node, 403, is adapted to receive the blocks of data from the first network node and to queue the received blocks in a queue.

Further, the second network node, 403, is adapted to check a block from top of the queue and if the block has a time-stamp the second network node, 403, is adapted to determine, using the time-stamp, if a maximum allowed latency has been exceeded. If the maximum allowed latency has been exceeded and there is at least one block containing data from another packet in the queue the second network node, 403, is adapted to discard blocks containing data from the same packet as the block with said time-stamp.

The second network node, 403, when operating in the network, 400, is configured to operate in accordance with embodiments of the method described earlier.

The invention may be realised in one embodiment in the form of a computer program, comprising instructions which, when executed on at least one processor, cause the at least one processor to carry out the method disclosed above. In one embodiment a carrier contains the computer program disclosed above, wherein the carrier is one of an electronic signal, optical signal, radio signal, or computer readable storage medium.

The invention claimed is:

1. A method of managing transport of packets transmitted over a time division multiplexed, TDM, link in a network, the method performed at a second network node and comprising:
   receiving blocks of data from a first network node, wherein data from one packet is received in a plurality of blocks and a first block from a packet has a time-stamp indicating an arrival time of the packet at the first network node, the blocks being multiplexed for transmission over the TDM link;
   queuing the received blocks in a queue;
   checking a block from a top of the queue;
   determining that the checked block has a time-stamp;
   using the time-stamp of the checked block to determine if a maximum allowed latency, of a packet for which the checked block contains data, has been exceeded; and
   responsive to determining that the maximum allowed latency has been exceeded and that there is at least one block containing data from another packet in the queue, discarding blocks containing data from the same packet as the checked block.

2. The method according to claim 1, further comprising:
   checking another block from a top of the queue;
   determining that said another block has a time-stamp;
   using the time-stamp of said another block to determine if a maximum allowed latency, of a packet for which said another block contains data, has been exceeded;
   responsive to determining that the maximum allowed latency, of the packet for which said another block contains data, has not been exceeded:
      assembling the packet for which said another block contains data, using the first and remaining blocks containing data from that packet; and
      delivering said assembled packet to a destination egress port of the second network node.

3. The method according to claim 1, further comprising:
   checking another block from a top of the queue;
   determining that said another block has a time-stamp;
   using the time-stamp of said another block to determine if a maximum allowed latency, of a packet for which said another block contains data, has been exceeded;
   responsive to determining that the maximum allowed latency, of the packet for which said another block contains data, has been exceeded and that there is no block containing data from another packet in the queue:

assembling the packet for which said another block contains data, using the first and remaining blocks containing data from that packet; and delivering said assembled packet to a destination egress port of the second network node.

4. The method according to claim 3, further comprising:
after starting to assemble the packet for which said another block contains data, finding a new block with a time-stamp in the queue; and responsive to finding the new block with the time-stamp in the queue, stopping assembly of the packet for which said another block contains data and discarding the blocks from the packet being assembled.

5. The method according to claim 1, wherein each block comprises a first label identifying a destination egress port at the second network node.

6. The method according to claim 5, wherein the first label further identifies an ingress port at the first network node.

7. The method according to claim 1, wherein each block comprises a second label identifying an ingress port at the first network node.

8. The method according to claim 1, wherein each block comprises a third label identifying a packet from which data is carried in the block.

9. The method according to claim 1, wherein a last block with data from a packet comprises a fourth label identifying said block as the last block of the packet.

10. The method according to claim 1, further comprising checking if there is at least one block containing data from another packet in the queue by checking if there is at least one time-stamped block in said queue.

11. The method according to claim 1, further comprising discarding, without queuing, incoming blocks which do not have a matching time-stamped block in the queue or in an output packet assembler.

12. The method according to claim 1, wherein a message transmitted from the first network node to the second network node occupies more than one packet, wherein the blocks containing data from the packets of said message comprise a fifth label identifying said message, and wherein the method comprises discarding blocks with the same fifth label responsive to determining that the maximum allowed latency has been exceeded for at least one of the packets of said message.

13. The method according to claim 1, wherein a packet comprises an eCPRI, evolved-Common Public Radio Interface, message or a plurality of concatenated eCPRI messages.

14. A second network node for managing transport of packets transmitted over a time division multiplexed, TDM, link in a network, the second network node comprising:
a processor and a memory, the memory containing instructions executable by the processor such that the second network node is operative to:
receive blocks of data from a first network node, wherein data from one packet is received in a plurality of blocks and a first block from a packet has a time-stamp indicating an arrival time of the packet at the first network node, the blocks being multiplexed for transmission over the TDM link;
queue the received blocks in a queue;
check a block from a top of the queue;
if the checked block has a time-stamp, determine if a maximum allowed latency has been exceeded using the time-stamp; and
if the maximum allowed latency has been exceeded according to said determining and there is at least one block containing data from another packet in the queue, discard blocks containing data from the same packet as the block with said time-stamp.

15. The second network node according to claim 14, the memory containing instructions executable by the processor such that the second network node is operative to, if it is determined that the maximum allowed latency has not been exceeded:
assemble a packet using the first and remaining blocks containing data from the packet; and
deliver said assembled packet to a destination egress port of the second network node.

16. The second network node according to claim 14, the memory containing instructions executable by the processor such that the second network node is operative to, if it is determined that the maximum allowed latency has been exceeded and there is no block containing data from another packet in the queue:
assemble a packet using the first and remaining blocks containing data from the packet; and
deliver said assembled packet to a destination egress port of the second network node.

17. The second network node according to claim 16, the memory containing instructions executable by the processor such that the second network node is operative to stop the assembling and discard the blocks containing data from the packet if, after starting to assemble the packet, a new block with a time-stamp is found in the queue.

18. The second network node according to claim 14, the memory containing instructions executable by the processor such that the second network node is operative to check if there is at least one block containing data from another packet in the queue by checking if there is at least one time-stamped block in said queue.

19. The second network node according to claim 14, wherein a packet comprises an eCPRI, evolved-Common Public Radio Interface, message or a plurality of concatenated eCPRI messages.

20. A network comprising:
a first network node; and
a second network node;
wherein the first and the second network nodes are configured to be connected by at least one time division multiplexed, TDM, link;
wherein the first network node comprises a first processor and a first memory, the first memory containing instructions executable by the first processor such that the first network node is configured to send packets to the second network node, wherein data from one packet is sent in a plurality of blocks and a first block from a packet has a time-stamp indicating an arrival time of the packet at the first network node and the blocks being multiplexed for transmission over the TDM link;
wherein the second network node comprises a second processor and a second memory, the second memory containing instructions executable by the second processor such that the second network node is configured to:
receive the blocks of data from the first network node;
queue the received blocks in a queue;
check a block from a top of the queue;
if the checked block has a time-stamp, determine if a maximum allowed latency has been exceeded using the time-stamp; and
if it is determined that the maximum allowed latency has been exceeded and there is at least one block containing data from another packet in the queue, discard blocks containing data from the same packet as the block with said time-stamp.

\* \* \* \* \*